United States Patent
Major

(10) Patent No.: US 7,202,909 B2
(45) Date of Patent: Apr. 10, 2007

(54) VIDEO SIGNAL PROCESSING WITH TWO STAGE MOTION COMPENSATION

(75) Inventor: Andrew Major, Petersfield (GB)

(73) Assignee: Snell & Wilcox Limited, Middlesex (GB)

( * ) Notice: Subject to any disclaimer, the term of this patent is extended or adjusted under 35 U.S.C. 154(b) by 370 days.

(21) Appl. No.: 10/221,482

(22) PCT Filed: Mar. 23, 2001

(86) PCT No.: PCT/GB01/01303

§ 371 (c)(1),
(2), (4) Date: Jan. 8, 2003

(87) PCT Pub. No.: WO01/78406

PCT Pub. Date: Oct. 18, 2001

(65) Prior Publication Data

US 2003/0095207 A1 May 22, 2003

(30) Foreign Application Priority Data

Apr. 7, 2000 (GB) .................................. 0008680.1

(51) Int. Cl.
*H04N 7/01* (2006.01)

(52) U.S. Cl. ........................................ 348/459; 348/452

(58) Field of Classification Search ................ 348/443, 348/452, 459, 448, 699, 700, 441; H04N 7/01, H04N 11/20, 5/14
See application file for complete search history.

(56) References Cited

U.S. PATENT DOCUMENTS 5,757,435 A * 5/1998 Wells ......................... 348/441

FOREIGN PATENT DOCUMENTS

| EP | 0294957 A2 * 12/1988 |
| EP | 0393906 A1 * 10/1990 |
| EP | 0514012 A2 * 11/1992 |
| EP | 0648398 A * 4/1995 |
| GB | 2253760 A * 9/1992 |
| WO | WO 9221201 A1 * 11/1992 |

OTHER PUBLICATIONS

Nojiri Y et al: "HDTV Standards Converter" NHK Laboratories Note, NHK Technical Research Laboratories. Tokyo, JP, No. 427, Aug. 1, 1994 (Aug. 1, 1994), pp. 1-12, XP000483397 ISSN: 0027-657X paragraph '04.1!; Figures 7, 8.*

* cited by examiner

*Primary Examiner*—Sherrie Hsia
(74) *Attorney, Agent, or Firm*—Sterne, Kessler, Goldstein & Fox P.L.L.C.

(57) ABSTRACT

In motion compensated standards conversion, an output video field is constructed from four input fields (two inner fields and two outer fields) by shifting pixel information from an outer field to the output field position in two stages, the first stage using a first motion vector between the outer field and the adjacent inner field and the second stage using a second motion vector being derived from a motion vector pointing from one inner field to the other inner field.

11 Claims, 2 Drawing Sheets

A

PRIOR ART

B

PRIOR ART

C

D

VIDEO SIGNAL PROCESSING WITH TWO STAGE MOTION COMPENSATION

BACKGROUND OF THE INVENTION

1. Field of the Invention

This invention relates to video processing and particularly to motion compensation techniques.

2. Background Art

The use of motion compensation is well known in a variety of processes, of which standards conversion is a good example. In one prior art approach, each output field is constructed from a number of stored input fields. For a given output pixel, information is read from the pixels in the input fields in conjunction with the motion vector associated with the required pixel. A problem associated with this approach is that the motion vectors must first have been converted to the new standard, causing extra complexity and creating artefacts.

A different approach to motion compensated standards conversion is detailed in EP 0 648 398. Here, the motion vectors are employed in writing the input fields to a store and the output picture is constructed as data is accumulated in the store. This method of approach has a number of advantages, including use of motion vectors at the input standard. There can sometimes be a difficulty, however, with discontinuous motion.

When there is discontinuous motion in the video source to be converted, the motion vectors from the outer of the four input fields may, when extrapolated to the output field position, point to different positions for the output pixel, creating aliasing and multiple images.

It is hence an object of the present invention to provide a motion compensated standards conversion system that results in a sharp output even in the face of discontinuous motion.

SUMMARY OF THE INVENTION

Accordingly, the invention consists in one aspect in a method for constructing an output video field from at least four input fields comprising two inner fields and two outer fields, wherein pixel information from an outer input field is temporally shifted to the output field position in two stages, the first stage using a first motion vector between the outer field and the adjacent inner field and the second stage using a second motion vector being derived from a motion vector pointing from said inner field to the other inner field.

BRIEF DESCRIPTION OF THE DRAWINGS/FIGURES.

Figure 1:
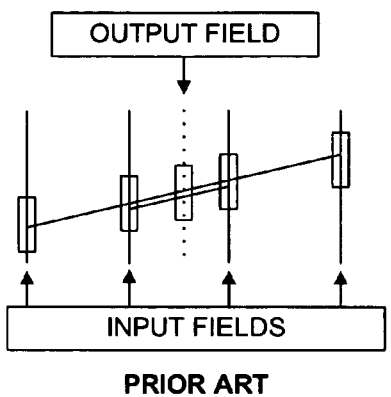
Figure 1:
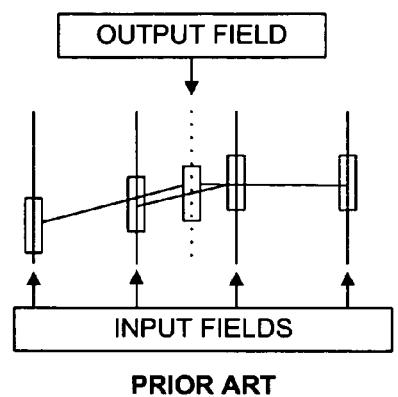
Figure 1:
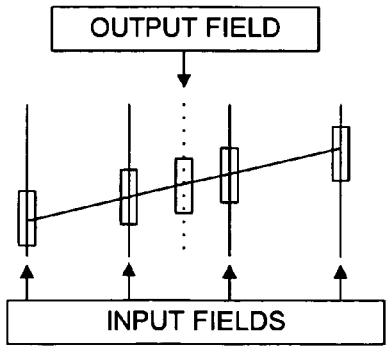
Figure 1:
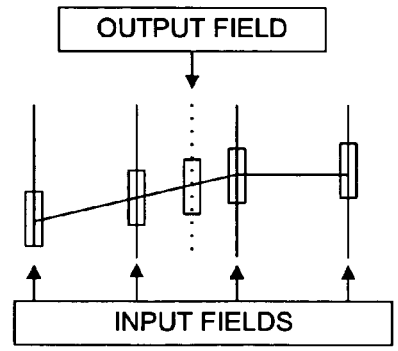
Figure 2:
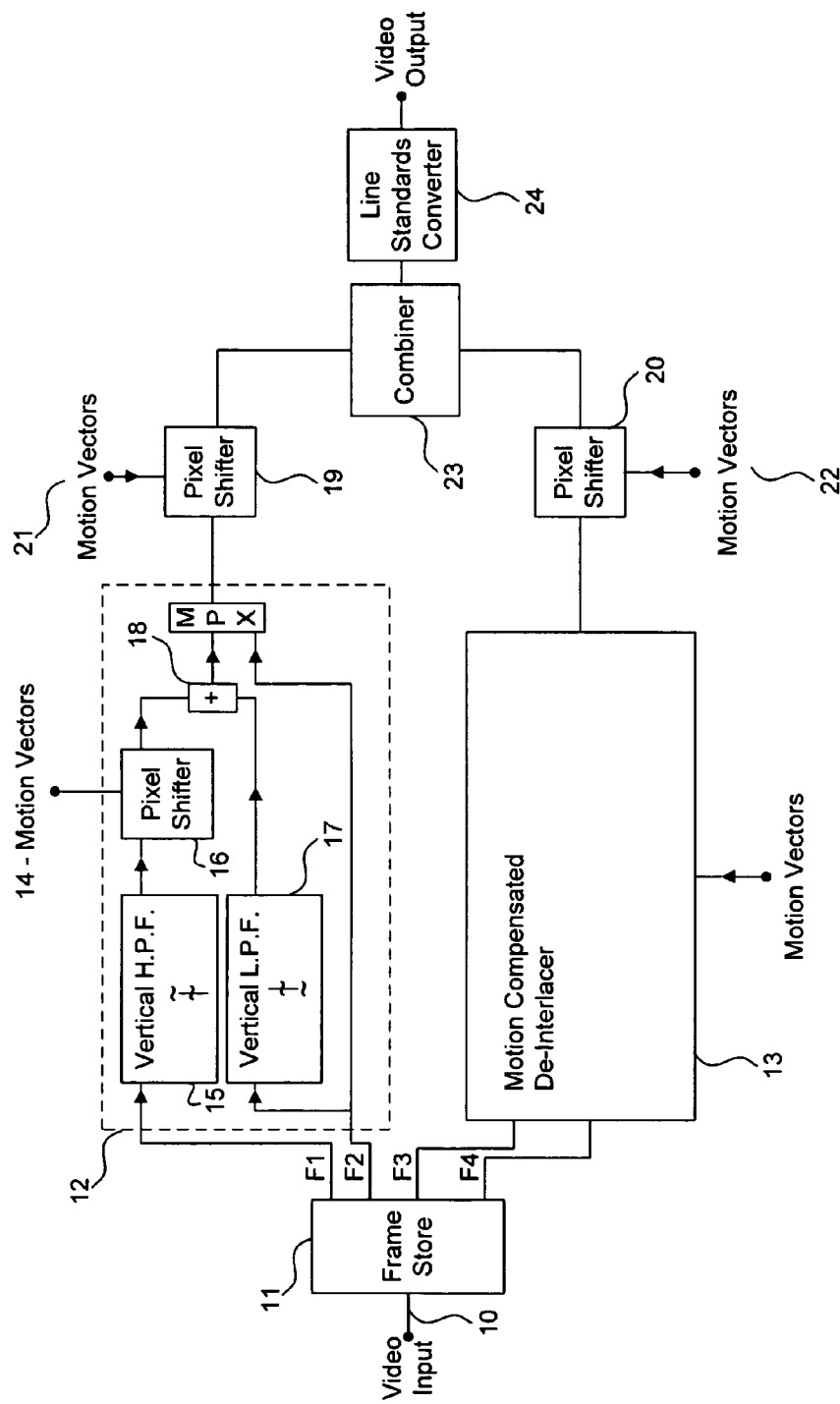

A preferred embodiment of the invention will now be described by way of example, with reference to the accompanying drawings, in which:

FIG. 1 is a set of diagrams illustrating the operation of the present invention, by way of comparison with prior art; and FIG. 2 is a block diagram of illustrating an embodiment of the present invention.

DETAILED DESCRIPTION OF THE INVENTION

Referring initially to FIG. 1, diagrams A and B show a prior art approach to the construction of an output field from four input fields. Each of the input fields is individually shifted by a motion vector to the temporal position of the required output field. In each case the motion vector is derived from a motion measurement conducted between the field to be shifted and an adjacent field; the measurements for the outer fields being "scaled up" to the required position, and the measurements for the inner fields being "scaled down" to the required position.

Diagram A shows that with continuous motion, the prior art is able to produce sharp images. It is clear from diagram B, however, that presented with non-continuous motion, the prior art approach may result in multiple images.

Diagrams C and D illustrate the present invention. It will be seen that pixel information from the outer input fields is brought to the output field position, not by extrapolation of vectors but in a two-stage process. First, the outer fields are shifted to the respective positions of the adjacent inner fields by respective vectors measured between the outer and inner fields. Then the results, together with the inner input fields, are shifted to the required output field position by respective interpolated vectors derived from motion measurements between the two inner fields. Thus in the first stage, the shift is the result of a measurement between consecutive fields and in the second, it is the result of scaling down a measurement between consecutive fields. Because there is no extrapolation of vectors, a sharp image always results.

This method also therefore holds significant advantages over known methods such as "vector tracing", in which a succession of motion measurements is made between adjacent fields and the resulting vectors are summed to obtain a vector describing the motion between non contiguous frames. In each stage of the embodiment illustrated in Diagrams C and D, information is carried no further than the distance between successive input samples. This produces sharper images in material having discontinuous motion, as misleading motion information from "old" frames is not reproduced in the output field.

A further advantage is that there is less variation in vertical resolution as the temporal phase of the output field (with respect to the input fields) changes.

It should be noted that the invention differs from the known method of. In the invention the motion compensation is carried out in stages and A motion compensated standards converter according to an embodiment of the invention will now be described. Referring to FIG. 2, an input video signal (10), which is accompanied by motion vectors from a motion estimator (not shown), is taken to a store (11). The store has four outputs (F1, F2, F3, F4) which provide the four fields which "straddle" the required output field. The two earlier fields are input to a motion compensated de-interlacer (12) and the two later fields are input into a similar motion compensated de-interlacer (13).

The de-interlacer (12) constructs a progressive picture at the temporal position corresponding to F2. Half of its output lines are taken directly from the input F2 lines, and the intervening lines are created using lines from both F1 and F2 together with motion vectors (14) measured between F2 and F1. High vertical frequencies from F1 are derived by the filter (15) and shifted to the temporal position corresponding to F2 by the pixel shifter (16). Low vertical frequencies are separated from F2 in the filter (17) and added to the temporally shifted high frequencies in the adder (18).

The second de-interlacer (13) operates in a similar way to create a progressive picture at the temporal position corresponding to F3 by using motion vectors measured between F3 and F4.

It should be noted that it is advantageous for the filter (15) to precede the shifter (16). This is because any motion estimation errors in plain areas of the picture will have no effect. If the shifter were to precede the filter, false edges due to motion measurement errors would pass through the high-pass filter and create artefacts.

The outputs from the de-interlacers (12) and (13) are connected to pixel shifters (19) and (20). These move the two outputs to the temporal position of the required output field. The shifters are controlled by respective motion vectors (21) and (22) which are derived by appropriate (down) scaling of the measured motion between F3 and F2, and between F2 and F3.

The two resulting (co-timed) output fields are combined in the combiner (23). This may be a simple averager or may vary the contributions in dependence upon various parameters which will be apparent to those skilled in the art. The output of the combiner is fed to a line standards converter (24) which carries out any necessary vertical spatial interpolation to arrive at the required number of output lines and, if necessary, to introduce interlace.

It should be understood that this invention has been described by way of examples only and that numerous modifications are possible without departing from the scope of the invention. For example: the de-interlacers (12) and (13) may use more than two fields; the pixel shifters (16), (19) and. (20) may be based on "write-side" architecture in which the write addresses of a store are modified in dependence upon the motion vectors, or based upon "read-side" architectures in which read addresses are manipulated in dependence on motion vectors; the shifters may, or may not, be capable of sub-pixel or sub-line shifts; and, the combination of fields may be modified when cuts or shot-changes are detected.

The invention claimed is:

1. A method for constructing an output video field from at least four input fields comprising two inner fields and two outer fields, wherein pixel information from the outer fields is temporally shifted to the output field position, the method comprising the steps of:

temporally shifting information from a first one of the outer fields to an adjacent inner field using a first motion vector between the first one of the outer fields and the adjacent inner field; and temporally shifting information from the inner field to the output field using a second motion vector derived from a motion vector pointing from said adjacent inner field to the other one of the inner fields.

2. A method according to claim 1, wherein for one of the outer fields that is closest to the output field position, the first motion vector is that pointing backward from the adjacent inner field.

3. A method for constructing an output video field from at least four input fields comprising two inner fields and two outer fields, wherein pixel information from the outer fields is temporally shifted to the output field position, the method comprising the steps of:

temporally shifting information from a first one of the outer fields to an adjacent inner field using a first motion vector between the first one of the outer fields and the adjacent inner field; and temporally shifting information from the inner field to the output field using a second motion vector derived from a motion vector pointing from said adjacent inner field to the other one of the inner fields, wherein only high frequency information is taken from the outer fields.

4. A method according to claim 3, wherein said high frequency information is vertical information.

5. The method according to claim 4, wherein the high frequency information is taken from the outer input fields before being temporally shifted.

6. A method according to claim 3, wherein the high frequency information is taken from the outer fields before being temporally shifted.

7. A motion compensation device for constructing an output video field from at least four input fields comprising two inner fields and two outer fields, comprising:

a store; and means for temporally shifting pixel information, and being adapted to temporally shift pixel information from an outer input field to the output field position in two stages, the first stage using a first motion vector between the outer field and the adjacent inner field and the second stage using a second motion vector being derived from a motion vector pointing from said inner field to the other inner field.

8. A method for constructing an output video field from at least four input fields comprising two inner fields and two outer fields, wherein pixel information from the outer fields is temporally shifted to the output field position, the method comprising the steps of:

temporally shifting information from a first one of the outer fields to an adjacent inner field using a first motion vector between the first one of the outer fields and the adjacent inner field; and temporally shifting information from the inner field to the output field using a second motion vector derived from a motion vector pointing from said adjacent inner field to the other one of the inner fields, wherein for one of the outer fields that is closest to the output field position, the first motion vector is that pointing backward from the adjacent inner and wherein only high frequency information is taken from the outer input fields.

9. The method according to claim 8, wherein said high frequency information is vertical information.

10. The method according to claim 9, wherein the high frequency information is taken from the outer input fields before being temporally shifted.

11. The method of claim 8, wherein the high frequency information is taken from the outer input fields before being temporally shifted.

* * * * *